May 27, 1924.

F. E. PERNOT 1,495,792

MEANS FOR RECEIVING ALTERNATING CURRENT ELECTRICAL SIGNALS

Filed July 11, 1923

F. E. PERNOT 1,495,792

MEANS FOR RECEIVING ALTERNATING CURRENT ELECTRICAL SIGNALS

Filed July 11, 1923     8 Sheets-Sheet 2

FIG. 2.

May 27, 1924.　　　　　　　　　　　　　　　　　　　　1,495,792
F. E. PERNOT
MEANS FOR RECEIVING ALTERNATING CURRENT ELECTRICAL SIGNALS
Filed July 11, 1923　　　　8 Sheets-Sheet 3

May 27, 1924.　　　　　　　　　　　　　　　　1,495,792
F. E. PERNOT
MEANS FOR RECEIVING ALTERNATING CURRENT ELECTRICAL SIGNAL
Filed July 11, 1923　　　　　8 Sheets-Sheet 4

Frederick Eugene Pernot
By John S. Backer
Atty.

May 27, 1924.

F. E. PERNOT

1,495,792

MEANS FOR RECEIVING ALTERNATING CURRENT ELECTRICAL SIGNALS

Filed July 11, 1923          8 Sheets-Sheet 5

May 27, 1924.

F. E. PERNOT 1,495,792

MEANS FOR RECEIVING ALTERNATING CURRENT ELECTRICAL SIGNALS

Filed July 11, 1923     8 Sheets-Sheet 7

May 27, 1924.

F. E. PERNOT 1,495,792

MEANS FOR RECEIVING ALTERNATING CURRENT ELECTRICAL SIGNALS

Filed July 11, 1923      8 Sheets-Sheet 8

Patented May 27, 1924.

1,495,792

UNITED STATES PATENT OFFICE.

FREDERICK EUGENE PERNOT, OF LONDON, ENGLAND.

MEANS FOR RECEIVING ALTERNATING-CURRENT ELECTRICAL SIGNALS.

Application filed July 11, 1923. Serial No. 650,912.

*To all whom it may concern:*

Be it known that I, FREDERICK EUGENE PERNOT, a citizen of the United States of America, residing at 70 Porchester Terrace, London, England, have invented new or Improved Means for Receiving Alternating-Current Electrical Signals (for which I have filed application in Great Britain, No. 14,713, May 25, 1922), of which the following is a specification.

This invention relates to new or improved means for receiving alternating current electrical signals and has for its principal object to enable the selection and reception of signals of a definite frequency or within a definite range of frequencies.

Further objects of the invention, the attainment of which are dependent upon the realization of the principal object, are means for adapting the incoming signals to actuate apparatus sensitive only to steady current signals so that the signals received may be more clearly defined, means for making the receiving system sensibly independent of other signals transmitted by alternating currents of frequencies different from that for which the apparatus is designed, as well as independent of disturbances which may take place in the transmission system.

The principal feature of the present invention comprises the detection of alternating currents by means of a plurality of moving coil systems with alternating magnetic fields displaced from each other in time phase position.

According to one method of carrying out this invention the incoming alternating current signals are passed through a plurality of coils in series, each coil being independently mounted capable of rotation and being positioned in the proximity of an alternating magnetic field.

The fields for each coil are independent the one from the other and means may be provided for exciting such fields as and when required.

Conveniently these fields are set up about laminated iron or steel cores by passing alternating currents through windings formed on the cores. Such currents are of the same or of substantially the same frequency as that of the currents to be received by the respective coils positioned in said fields and by virtue of providing a plurality of such movable coil systems for each current to be received and arranging the exciting currents out of time phase with respect to one another there will always be at least one of the coils displaced and thus each signal transmitted will be detected.

In order that this invention may be more readily understood reference will now be made to the accompanying drawings, wherein:—

In the embodiment illustrated herewith the current to be received is adapted to pass through and round skeleton coils 1, there being provided two of such coils and auxiliary apparatus (i. e. two complete instruments as hereinafter described) for each current to be received.

As previously stated such coils are each positioned within an alternating magnetic field set up by means of alternating currents of the same or substantially the same frequency as that of the current passing through the coils and the alternating currents producing the fields are 90° out of phase with respect to one another.

Referring now to Figs. 1, 2, 3 and 4 the magnets 2 and 3 are of laminated metal connected by a laminated yoke 4. Such yoke is rigidly mounted on standards 5 secured to the instrument stand 6. The laminations comprising the magnets 2 and 3 are pivotally connected to the yoke at 7 and are adjustably mounted at the forward extremity on standards 5' such latter laminations are of L shape configuration the extremities of the horizontal arms of the two L's being arranged in comparatively close proximity, the gap therebetween being adjusted by means of screws 8 working in guides carried by the standards 5' and rotating said laminations about their pivots 7.

Figure 10:
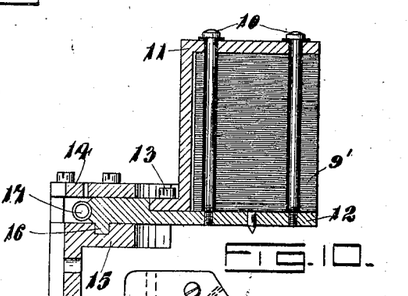
Fig. 10, is a sectional elevational view of the magnetic core and bracket showing means for adjusting same in a horizontal plane.
Figure 11:
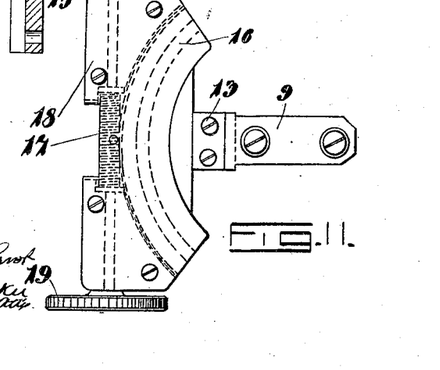
Fig. 11, is a plan view thereof.

Positioned within the gap between the magnets 2 and 3 is a laminated core 9 the lamination 9' being retained in position by bolts 10 and retaining members 11 and 12 (Fig. 10). Such latter members are fastened together by screws 13 and member 12 extends rearwardly in a horizontal plane between guides 14 and 15. A lip formed on the member 12 is accommodated within a corresponding recess of arcuate configuration as at 16.

The rear vertical face of member 12 is of arcuate configuration and is formed with teeth engaging a worm 17 mounted upon a shaft 18 housed within bearings in the guide 15 and movement of the core 9 is effected through the medium of worm 17 and member 12 by imparting rotary motion to a wheel 19.

The coil 1 is positioned exteriorly of the core 9 within the gap between the magnets 2 and 3 and bearing for the coil may be provided as at 20 (Fig. 12) comprising a jewel sink on the coil accommodating a hardened steel pin on the core.

Figures 16, 17, 18, 19:
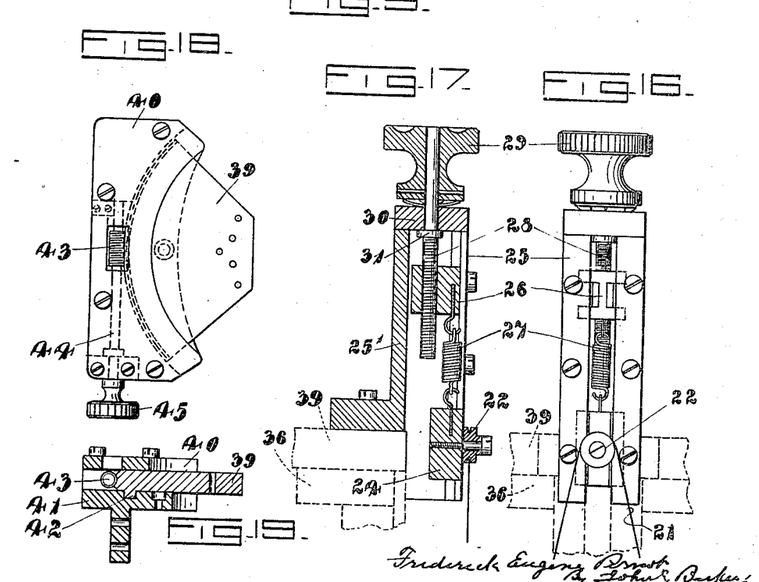
Fig. 16, is a front elevation of the spring suspension head for said coil.
Fig. 17, is an end sectional view thereof.
Fig. 18, shows in plan means for effecting angular adjustment of the coil.
Fig. 19, is a sectional elevation thereof.

Said coil is suspended from its upper extremity by a thread 21 passing round a wheel 22 and being spaced intermediate the coil and wheel by adjustable pins 23. The wheel 22 is carried from a block 24 positioned within slideways 25 and connected to a block 26 similarly positioned within said slideways. Said two blocks are connected by a spring 27 and the block 26 accommodates a screw 28 furnished with a bevelled head 29. Said screw is housed within a frame 30 and formed with a collar 31 so that upon rotation of the head 29 the tension in the thread 21 is correspondingly altered.

Figure 14:
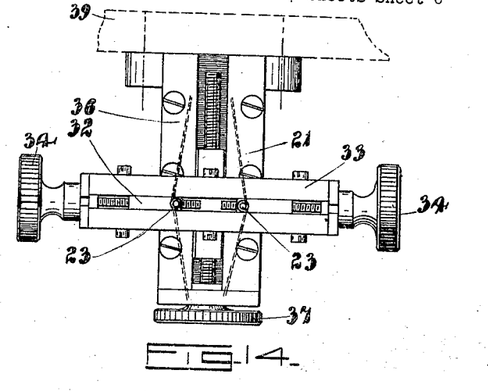
Fig. 14, shows in front elevation adjusting means therefor.
Figure 15:
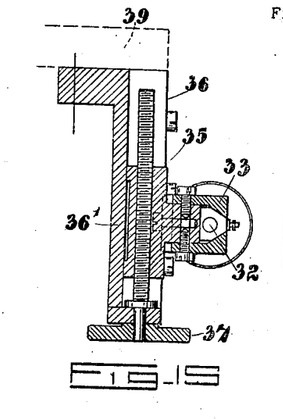
Fig. 15, is an end sectional view thereof.

The pins 23 are carried by blocks 32 mounted in slideways 33 and independent headed screws 34 are provided for moving said blocks along the slideways in a horizontal direction, such movement effecting the spacing of the thread 21.

The slideways 33 are themselves carried by a block 35 mounted in vertical slideways 36 and a headed screw 37 provided for imparting movement in a vertical plane to said block. Frame members 25' and 36' for the slideways 25 and 36 respectively are provided with horizontally projecting flanges which are adapted to be secured by screws or bolts to a member 39, the flange of frame 25' being secured to the upper face and the flange of the frame 36' to the underneath face of said member.

Such member is accommodated within guides 40 and 41, a lip on member 39 being accommodated within a corresponding recess of arcuate configuration as at 42.

The rear vertical face of member 39 is of arcuate configuration and formed with teeth engaging the teeth formed on a worm wheel 43 mounted on a shaft 44 housed within bearings carried by the guides 40 and 41. A knurled head is provided as at 45 for imparting rotary motion to worm 43 and the displacing member 39. Displacement of such latter member guided by the lip and recess 42 produces angular displacement of the frames 25' and 36' and associated parts, and through the medium of the thread 21 provides for displacement of the coil 1.

Figure 8:
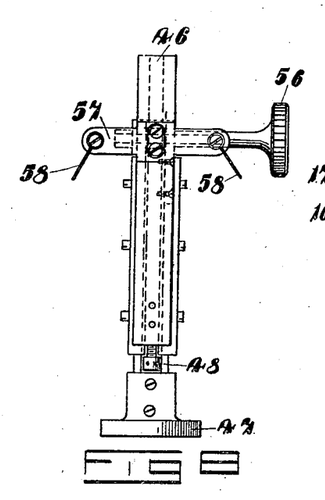
Fig. 8, shows in elevation the pillar and rack for raising and lowering the coil, magnetic core and parts associated therewith.
Figure 9:
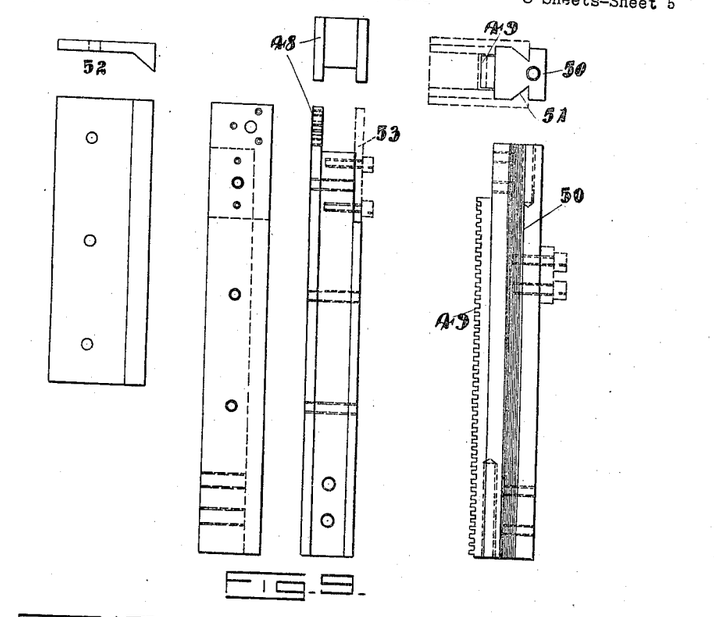
Fig. 9, shows the elements thereof dismantled.
Figures 27, 28, 29:
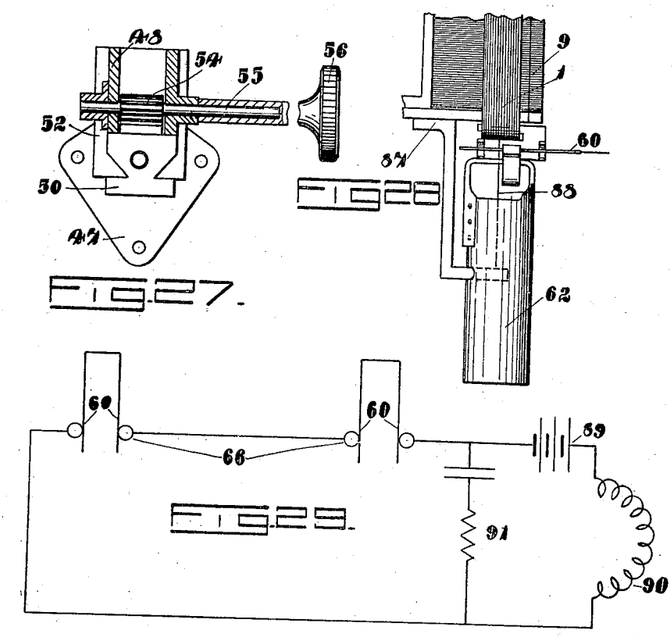
Fig. 27, is an enlarged plan view of the pillar and rack in part section.
Fig. 28, shows a modified form of bearing for the coil.
Fig. 29, is a diagrammatic representation of a relay circuit for use in connection with the present invention.

The guides 15 and 41 for the members 12 and 39 respectively, such members effecting displacement of the core 9 and coil 1 respectively as described, are held in fixed relation to a pillar member 46 (Fig. 8). Certain of the elements constituting the pillar are shown dismantled in Fig. 9 and Fig. 27 is a sectional plan view.

Figure 26:
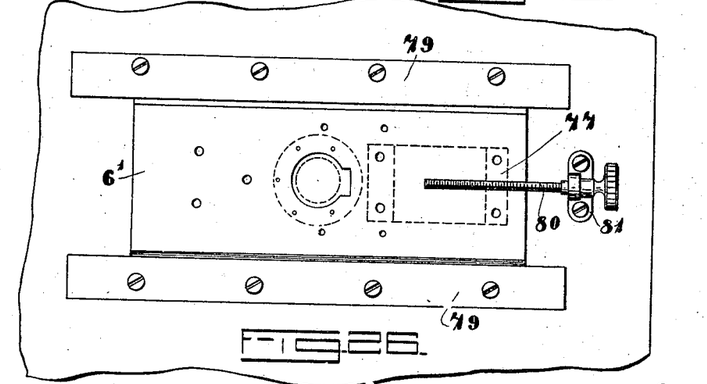
Fig. 26, is a plan view showing means for effecting adjustment of the base.

Said pillar member comprises a base 47 secured to the sliding base 6' of Fig. 26. Fastened to the rear of base 47 is a channel upright 48 accommodating within the channel a rack 49 carried by or integral with a movable member 50. Said latter member is formed with vertical grooves 51 accommodating side closure uprights 52 secured by bolts to the channel upright 48 and such uprights 52 both guide and retain the member 50.

The upper part of one side of the channel member 48 comprises a detachable plate 53, such plate being detachable for facilitating assembly of pinion 54 on shaft 55 accommodated by member 48 and plate 53. A knurled head is provided as at 56 for imparting rotary motion to pinion 54 which engaging with rack 49 imparts vertical movement to member 50. It is to the member 50 that guides 15 and 41 are connected by bolts and consequently rotation of head 56 imparts vertical movement to such guides and associated parts and this controls the vertical position occupied by the coil 1 and core 9.

Attached to the front face of member 50 is a terminal block 57 of ebonite construction and furnished with two insulated projecting bare wires as indicated at 58, and also with binding nuts. To these bare wires are soldered the terminals of coil 1.

Figures 12, 13, 20, 21:
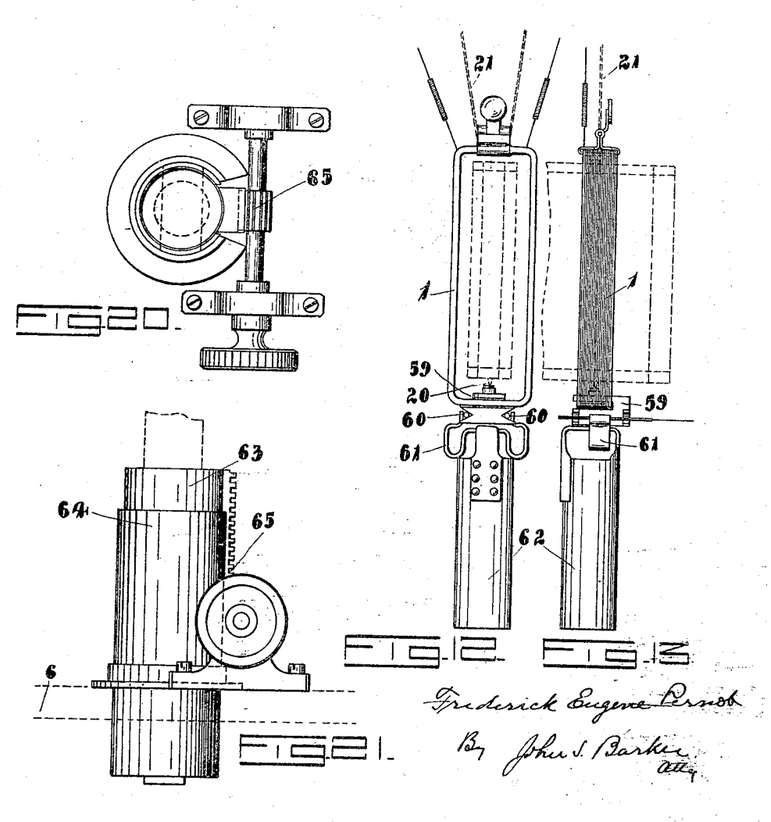
Fig. 12, shows the coil in front elevation.
Fig. 13, is an end view thereof.
Fig. 20, is a plan view of the coil damping apparatus.
Fig. 21, is an elevation thereof.

The coil 1 suspended at its upper extremity from thread 21 is accommodated at its lower extremity within a groove formed in a block 59. This block is further furnished in two opposite sides with a sawgate each accommodating antenna 60, retained in their placed position by suitably designed springs 61 and attached to the block 59 is a damping cylinder 62. Said cylinder is accommodated within an oil container 63 positioned within a cylindrical member 64 secured to the movable base 6' there being provided rack and pinion as at 65 for raising and lowering container 63 so that cylinder 62 may remain fully immersed or immersed to any desired extent irrespective of the vertical position of the coil 1.

Figures 22, 23, 24, 25:
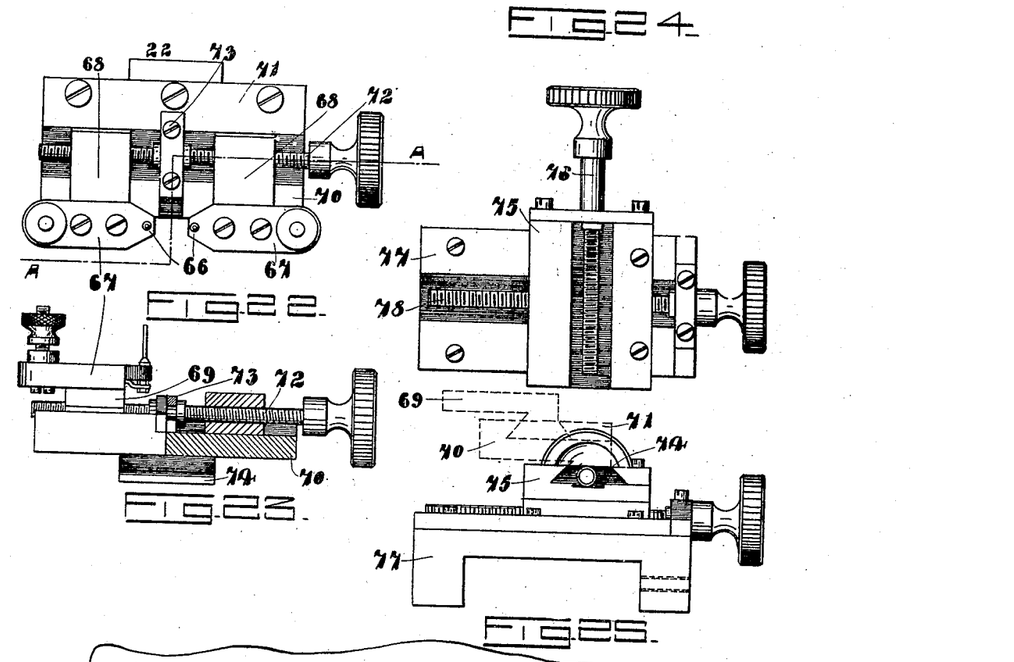
Fig. 22, is a plan of the butts and adjusting means therefor.
Fig. 23, is an elevation thereof part sectional along the line A—A.
Fig. 24, is a plan view showing the bias and sensitivity adjustment slides for the butts.
Fig. 25, is a front elevation thereof.

Each of said antenna is adapted to make contact with a butt 66 carried by and projecting vertically upwards from an insulating block 67 mounted upon a carriage 68. Each of said carriages is provided with a tongue 69 accommodated within a corresponding groove formed within the butt carriage slide 70, a detachable guide being provided as at 71. A right and left handed screw 72 accommodated within an anchor block 73 engages with corresponding female threads formed in each carriage so that on rotation of said screw the carriages are moved further apart or nearer together depending upon the direction of rotation.

The slide 70 is provided with a tongue as at 74 accommodated within the bias adjustment slide 75 and a screw as at 76 is provided for displacing slide 70 relative to slide 75.

Similarly the bias adjustment slide 75 is adapted to be displaced relative to the sensitivity slide 77 by means of a screw 78 and such latter slide is rigidly mounted upon the movable base 6'. Such latter base comprises a plate accommodated within slides 79 secured to the instrument stand 6. A screw 80 working in bearings 81 mounted on said stand engages a female thread formed in the slide 77 and rotation of such screw will accordingly effect displacement of the movable base 6' and associated parts relative to the instrument stand 6.

Figure 1:
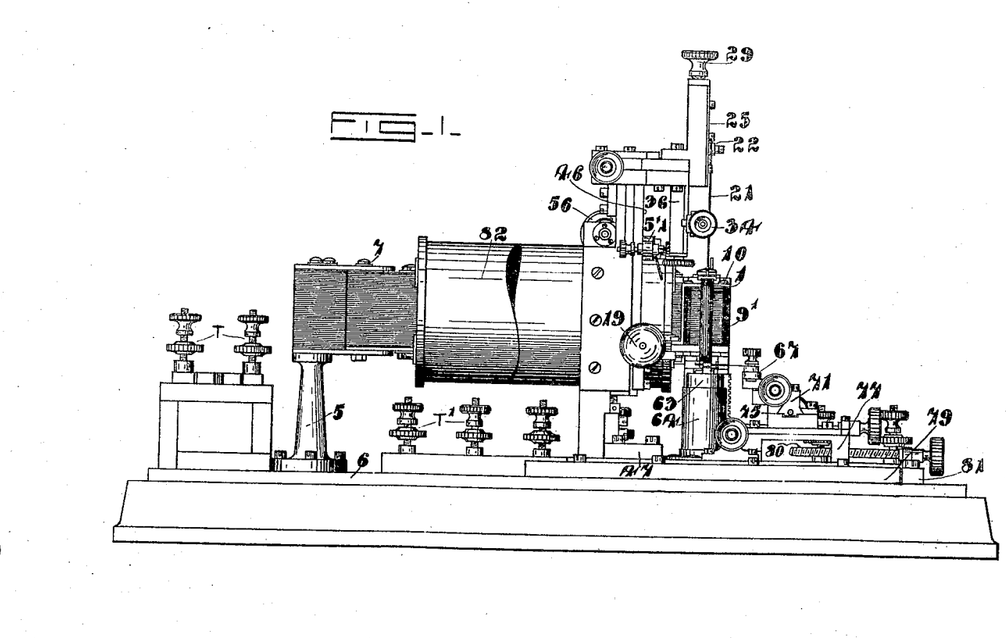
Fig. 1, is a side elevational view of one type of apparatus constructed in accordance with this invention.
Figure 2:
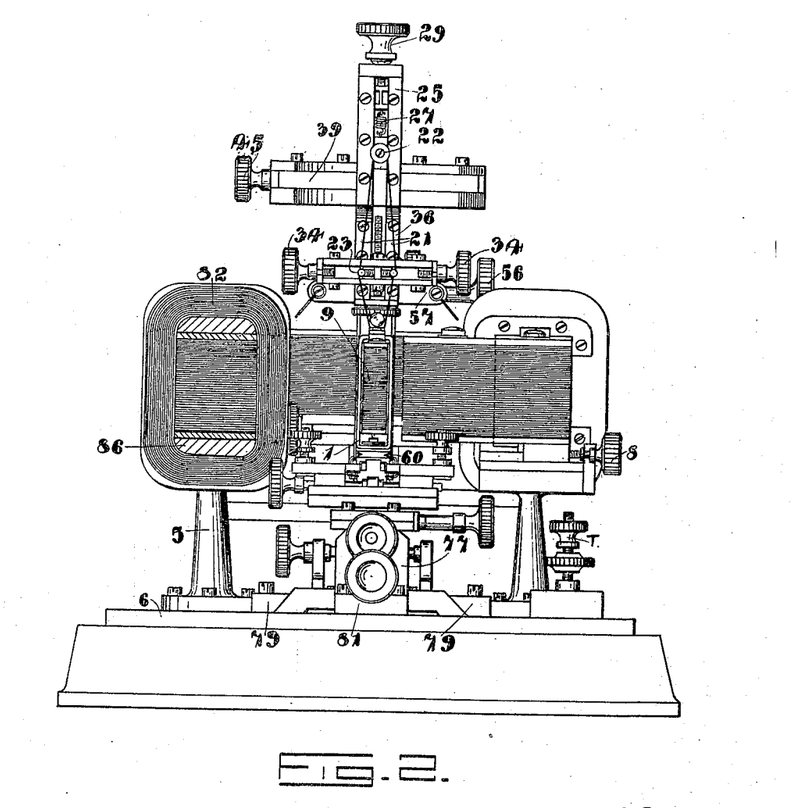
Fig. 2, is a front view thereof.
Figure 3:
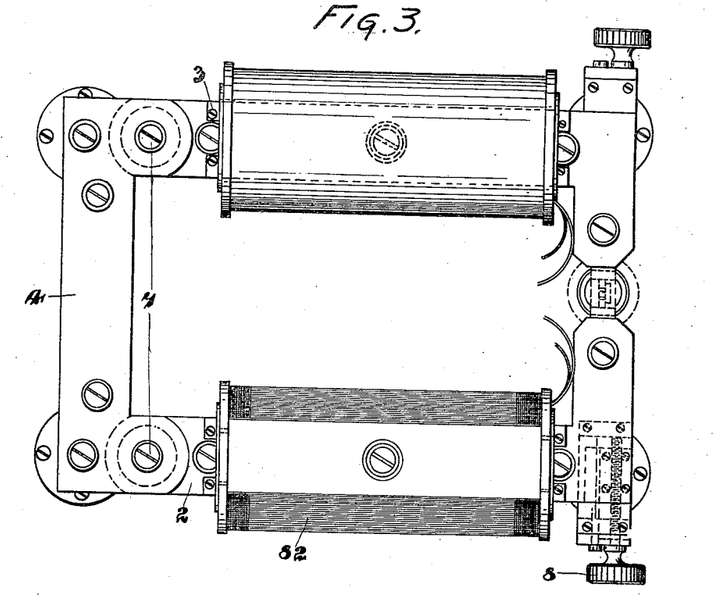
Fig. 3, is a plan part sectional of the magnets.
Figure 4:
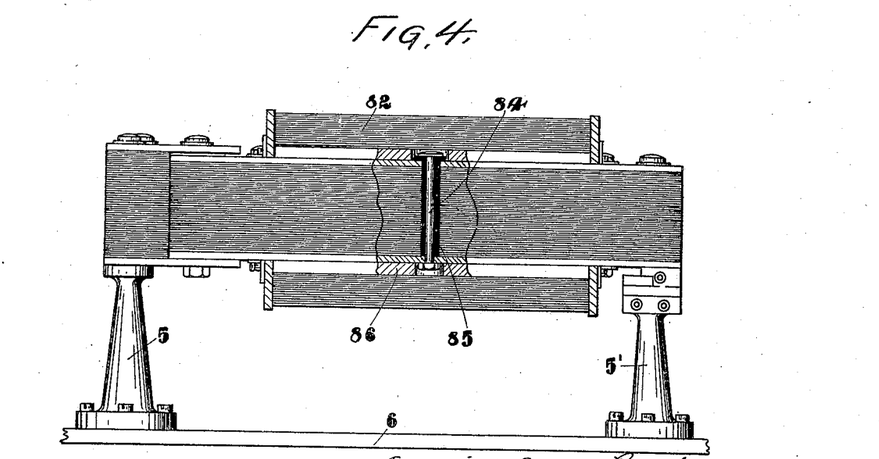
Fig. 4, is a part sectional elevation thereof.
Figure 5:
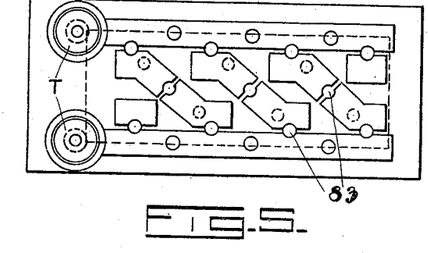
Fig. 5, is a plan of the terminal box for the magnet windings.
Figure 6:
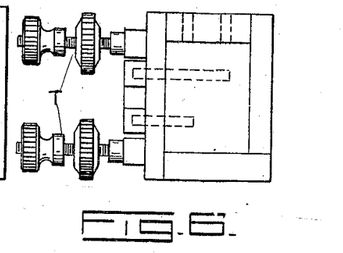
Fig. 6, is an end view thereof.
Figure 7:
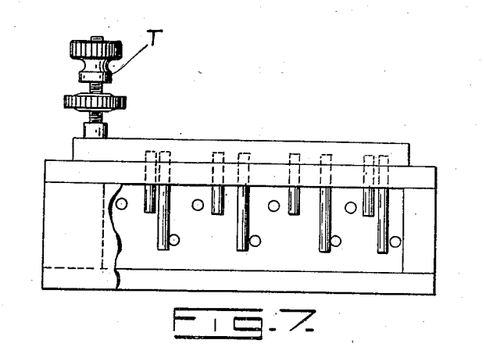
Fig. 7, is a front elevational view part sectional.

The terminals from the magnet coils 82, there being two independent windings on each arm 2 and 3, are conducted to a terminal box as shown in Figs. 5, 6 and 7 and the requisite connections made by means of plugs inserted in the holes 83. By this means any desired combination of the windings can be obtained and the magnetic field set up about the arms 2 and 3 varied accordingly.

The source of power for setting up this magnetic field is connected to the terminals T.

Pole screws as at 84, surrounded by ebonite bushings 85 are preferably provided as shown (Figs. 3 and 4) the heads of the screws being preferably countersunk in the winding shim 86.

Alternative to the sapphire sink shown in Fig. 12 a projection 87 from the underneath face of the magnetic core 9 (Fig. 28) may project downwardly within the container 63 and the lower extremity of the coil 1 connected to such projection by means of a suitable thread or the like 88, such form of bearing offering less resistence to rotation of the coil.

Fig. 29 shows a method of actuating a relay circuit 90 by the employment of two instruments of the type described wherein the antennæ are normally in contact with the butts and the relay is actuated by such contact being broken. A battery is provided as at 89 and the butts connected in series therewith together with the relay circuit or coil 90. A condenser and resistance 91 are preferably placed in paralled to prevent sparking at the butts.

Normally the current from the battery flows round the circuit until same is broken by one of the antenna breaking contact with its respective butt when apparatus (e. g. the armature of an electro-magnet) is actuated to record the break i. e. the signal.

Figure 30:
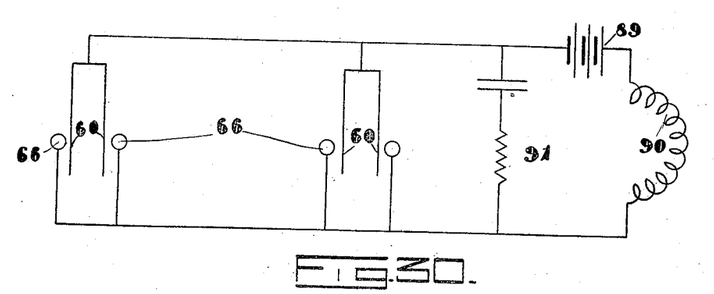
Fig. 30, is a modification thereof.

In Fig. 30 it will be seen that the antennæ are normally out of contact with the butts and that when contact is made an electrical circuit is completed thus enabling the signal to be recorded by any known or desired means.

In practice as illustrated in Figs. 29 and 30 two instruments of the type described herein are utilized for the reception of each signal, the received current passing through each of the coils 1 of the two instruments and such coils being arranged in series. Conveniently the ends of said coils are connected to the terminal blocks 57 which in turn are connected with terminals T' on the stand 6 the two wires carrying the currents to be received also being connected to terminals T'.

The terminals T are connected to a source of power supplying electric current at the same or substantially the same frequency as that passing through the coils 1 and a magnetic field is thus set up about the magnets 2 and 3. For reasons previously stated the fields of the two instruments are 90° out of phase.

The magnetic flux of each instrument is most dense in the gap between the magnets 2 and 3 and the lines of force will concentrate in the core 9 positioned within said gap. The current passing through the coils 1 although possibly of exceedingly small magnitude will set up a magnetic field about each coil and one or both of the coils will be deflected and one or more antennæ make or break connection with one or more butts to record the signal in the manner described.

The fields set up about the magnets 2 and 3 can be adjusted by varying the positions of the plugs in the holes 83 until the best results for any particular received current are obtained.

Further it will be appreciated that the coils 1 are extremely delicate and sensitive but by regulation of the screws 29, 34 and 37 requisite adjustments in suspension can be obtained and the damping varied by raising or lowering container 63.

It is essential that the coil 1 and core 9 should occupy the most favourable position in the magnetic field and such adjustment can readily be effected by raising and lowering member 50 or by traversing the base 6'.

Further the magnets 2 and 3 can themselves be adjusted by means of screw members 8 and both the coil 1 and core 9 can be angularly displaced independent of each other through the medium of worm wheels 43 and 17 respectively.

The antennæ 60 are of an extremely delicate nature and it is essential therefore that the butts 66 shall be positioned in the correct position relative to the antennæ. Such positioning is readily effected by adjusting the butt carriage, bias and sensitivity slides as hereinbefore described.

I claim:

1. In systems for detecting alternating currents, a plurality of movable coils, the current to be detected passing therethrough, an independent alternating magnetic field to each coil, said fields displaced from one another in time phase position, and an electric current source for exciting said fields, said latter current being independent of the current to be detected.

2. In systems for detecting alternating currents, a plurality of movable coils, the current to be detected passing therethrough, an independent alternating magnetic field to each coil, all of said fields alternating at substantially the same frequency as the current to be detected, said fields displaced from one another in time phase position, and an electric current source for exciting said fields, said latter current being independent of the current to be detected.

3. In systems for detecting alternating currents, a plurality of skeleton coils, an independent electro-magnet to each coil, said coils intermediate the poles of said magnets and connected in series with one another and the source of current to be detected, an electric current supply to each of said magnets, said currents of substantially the same frequency as and independent of that flowing through the coils and the alternating magnetic fields set up about the magnets being displaced from one another in time phase position.

4. In systems for detecting alternating currents, a plurality of devices each comprising a coil rotatably suspended intermediate the poles of an electro-magnet, said magnet energized by current from an independent source and of substantially the same frequency as that of the current to be detected, said latter current passing through the coil, antennæ carried by the coil, said antennæ working in conjunction with butts, a relay circuit including said butts, said currents operating to produce rotation of the coil, and said coil upon rotating actuating the relay circuit through the medium of said butts.

5. In systems for detecting alternating currents, a plurality of devices each comprising a coil, the coils of each device connected in series with the source of current to be detected, each coil being rotatably suspended intermediate the poles of an electro-magnet, and said poles being adjustable, all of said magnets energized by currents of substantially the same frequency as and independent of the current to be detected, the currents supplied to the magnets being displaced from one another in time phase relation, and a relay circuit the operation of which is controlled by the coils.

6. In systems for detecting alternating currents a plurality of coils connected in series with the source of current to be detected, independent electro-magnets to each coil, alternating currents energizing said magnets, said latter currents displaced from one another in time phase position and of substantially the same frequency as that of the current to be detected, said magnets of laminated metal and the gap between the poles of each magnet adjustable.

7. In systems for detecting alternating currents a plurality of coils connected in series with the source of current to be detected, said magnets comprising two independent arms of laminated metal, each arm pivotally connected to a laminated yoke, said yoke carried by standards and means for displacing the arms relative to the yoke to adjust the gap between the poles.

8. In systems for detecting alternating currents a plurality of coils connected in series with the source of current to be detected, independent electro-magnets to each coil, each magnet comprising two arms, said arms constructed of laminated metal, a laminated yoke connecting said arms, said yoke mounted on standards, pivotal connection between each arm and the yoke, said arms of L configuration, the extremities of the horizontal arms of the two L's in close proximity, standards beneath the front ends of the arms, guides carried thereby, bearing members attached to the underside of said arms, said members movable in said guides, screws for effecting said movement and said movement adjusting the gap between the magnets.

9. In systems for detecting alternating currents a plurality of devices comprising an electro-magnet, a gap between the poles thereof, a laminated core within said gap, a coil surrounding said core, said coil suspended from its upper extremity and rotatable relative to the core, the coils of all the devices connected in series with the source of current to be detected, alternating currents energizing said magnets, said latter currents displaced from one another in time phase position and of substantially the same frequency as that of the current to be detected.

10. In systems for detecting alternating currents, a plurality of devices comprising an electro-magnet, a gap between the poles thereof, a laminated core within said gap, retaining members for said laminations, bolts connecting said retaining members, one of said members extending rearwardly in a horizontal plane, the rear face of said latter member of arcuate configuration, said face screw threaded, a screw engaging said threads, said screw mounted upon a rod, said rod rotatable, said rod and screw housed in bearings, said bearings rigidly mounted on a standard, said standard mounted upon the base of the device, a skeleton coil surrounding said core, said coil vertically suspended from its upper extremity, the coils of all the devices connected in series with the source of current to be detected, alternating currents energizing the magnets of each device, said latter currents displaced from one another in time phase position and of substantially the same frequency as that of the current to be detected.

11. In systems for detecting alternating currents, a plurality of devices comprising an electro-magnet, a gap between the poles thereof, a laminated core within said gap, a coil surrounding said core, a bearing for the coil on the base of said core, an endless thread connected to the upper extremity of the coil, said thread passing round a wheel, means for varying the tension of said thread and the coils of all the devices connected in series with the source of current to be detected, alternating currents energizing the magnets of each device, said latter currents displaced from one another in time phase position and of substantially the same frequency as that of the current to be detected.

12. In systems for detecting alternating currents, a plurality of devices comprising an electro-magnet, a gap between the poles thereof, a core positioned within said gap, a skeleton coil surrounding said core, a jewel sink on the coil accommodating a pin on the core, an endless thread attached to the upper extremity of said coil, said thread passing at its upper extremity around a wheel, pins intermediate the coil and wheel, said pins adjustable and bearing on the thread, a block carrying said wheel, slideways accommodating said block, a second block accommodated on said slideways, a spring connecting said two blocks, the second block accommodating a screw, said screw housed within a frame, a collar on said screw, rotation of said screw adjusting and tensioning said thread, and the coils of all the devices connected in series with the source of current to be detected, alternating currents energizing the magnets of each device, said latter currents displaced from one another in time phase position and of substantially the same frequency as that of the current to be detected.

13. In systems for detecting alternating currents, a plurality of devices comprising an electro-magnet, a gap between the poles thereof, a core positioned within said gap, a skeleton coil surrounding said core, a jewel sink on the coil accommodating a pin on the core, an endless thread attached to the upper extremity of said coil, said thread passing at its upper extremity around a wheel, pins intermediate the coil and wheel, said pins carried by blocks mounted in slideways, independent screws accommodated by said blocks, rotation of said screws imparting traverse movement to said blocks along the slideways in a horizontal direction, said movement effecting spacing of the thread, said slideways carried by a second block said latter block mounted in vertical slideways, a screw for imparting traverse movement to said latter block, frame members retaining said second slideways, said frame connected to a horizontal member, the rear face of said member of arcuate configuration, said face screw-threaded, a worm wheel engaging threads on said face, said wheel mounted on a shaft, said shaft housed within bearings, said bearings carried by guides, said guides mounted upon a pillar, said pillar extending vertically upward from the face of the device and the coils of all the devices connected in series with the source of current to be detected, alternating currents energizing the magnets of each device, said latter currents displaced from one another in time phase position and of substantially the same frequency as that of the current to be detected.

14. In systems for detecting alternating currents, a plurality of devices comprising an electro-magnet, a gap between the poles thereof, a core positioned within said gap, a skeleton coil surrounding said core, an endless thread attached to the upper extremity of said coil, said coil passing over a wheel, means for varying the tension in said thread, means for adjusting the position of said coil, said tensioning and adjusting means carried by a vertical pillar, said pillar comprising a base, slideways extending upwardly from said base, a slide accommodated within said slideways, a rack formed on said slide, a pinion engaging said rack rotation of said pinion imparting traverse motion to said slide, and the coils of all the devices connected in series with the source of current to be detected, alternating currents energizing the magnets of each device, said latter currents displaced from one another in time phase position and of substantially the same frequency as that of the current to be detected.

15. In systems for detecting alternating currents, a plurality of devices comprising an electro-magnet, a gap between the poles thereof, a core positioned within said gap, a skeleton coil surrounding said core, an endless thread attached to the upper extremity of said coil, said coil passing over a wheel, means for varying the tension in said thread, means for adjusting the position of said coil, said tensioning and adjusting means carried by a vertical pillar, said pillar secured to a foot, said foot mounted upon a base, slideways on the device bed accommodating said base, a screw engaging a female thread formed in a member mounted on said base and rotation of said screw imparting traverse movement to said base, the coils of all the devices connected in series with the source of current to be detected, alternating currents energizing the magnets of each device, said latter currents displaced from one another in time phase position and of substantially the same frequency as that of the current to be detected.

16. In systems for detecting alternating currents a plurality of devices comprising an electro-magnet, a gap between the poles thereof, a laminated core within said gap, said magnet mounted upon a bed, said coil and associated parts mounted upon a base, said base movable relative to the magnet and the coils of all the devices connected in series with the source of current to be detected, alternating currents energizing the magnets of each device, said latter currents displaced from one another in time phase position and of substantially the same frequency as that of the current to be detected.

17. In systems for detecting alternating currents a plurality of devices comprising an electro-magnet, a gap between the poles thereof, a laminated core within said gap, said coil connected from its upper extremity by a thread, a damping cylinder connected to the lower extremity of said coil, said cylinder accommodated within an oil container, said container adjustable relative to the coil, the coils of all the devices connected in series with the source of current to be detected, alternating currents energizing the magnets of each device, said latter currents displaced from one another in time phase position and of substantially the same frequency as that of the current to be detected.

18. In systems for detecting alternating currents a plurality of devices comprising an electro-magnet, a gap between the poles thereof, a laminated core within said gap, antennæ carried by said coil, butts making contact with said antennæ, each butt projecting from an insulating block, each block mounted upon a carriage, tongues on said carriages, said tongues accommodated with a groove, said groove formed within the butt carriage slide, a right and left handed screw, said screw accommodated within an anchor block, the threads of said screw engaging with corresponding female threads formed in the carriages, rotation of said screw imparting traverse motion to the carriages, the coils of all the devices connected in series with the source of current to be detected, alternating currents energizing the magnets of each device, said latter currents displaced from one another in time phase position and of substantially the same frequency as that of the current to be detected.

19. In systems for detecting alternating currents a plurality of devices comprising an electro-magnet, a gap between the poles thereof, a core within said gap, antennæ carried by said coil, said antennæ making contact with butts, said butts mounted upon carriages, said carriages accommodated within the butt carriage slide, said slide provided with a tongue, said tongue accommodated within a bias adjustment slide, a screw accommodated within said latter slide, the thread of said screw engaging a female thread in said tongue, rotation of said screw imparting traverse movement to the butt carriage slide, the coils of all the devices connected in series with the source of current to be detected, alternating currents energizing the magnets of each device, said latter currents displaced from one another in time phase position and of substantially the same frequency as that of the current to be detected.

20. In systems for detecting alternating currents a plurality of devices comprising an electro-magnet, a gap between the poles thereof, a core within said gap, antennæ carried by said coil, butts making contact with said antennæ, said butts mounted upon carriages, said carriages accommodated within the butt carriage slide, said slide accommodated within the bias adjustment slide, a tongue carried by said latter slide, said tongue accommodated within a groove in the sensitivity slide, a rotatable screw, said screw imparting traverse movement to the bias adjustment slide, said sensitivity slide mounted upon a base, said base, movable relative to the bed of the device, the coils of all the devices connected in series with the source of current to be detected, alternating currents energizing the magnets of each device, said latter current displaced from one another in time phase position and of substantially the same frequency as that of the current to be detected.

21. In systems for detecting alternating currents a plurality of devices comprising an electro-magnet, a gap between the poles thereof, a core within said gap, a coil surrounding said core, an endless thread connected to the upper extremity of said coil, said thread extending upwardly over supports, a bracket attached to, and connected from the base of the core, a thread connecting the lower extremity of said bracket and coil, and the coils of all the devices connected in series with the source of current to be detected, alternating currents energizing the magnets of each device, said latter currents displaced from one another in time phase position and of substantially the same frequency as that of the current to be detected.

22. In systems for detecting alternating currents a plurality of devices comprising an electro-magnet, a gap between the poles thereof, a core within said gap, two independent windings to each arm of the magnets, connection from said windings to a terminal box, plugs for making connection, and the coils of all the devices connected in series with the source of current to be detected, alternating currents energizing the magnets of each device, said latter currents displaced from one another in time phase position and of substantially the same frequency as that of the current to be detected.

FREDERICK EUGENE PERNOT.
Witnesses:
 RUSSELL H. RHODES,
 MARGARET LIVINGSTON.